Figure 1:
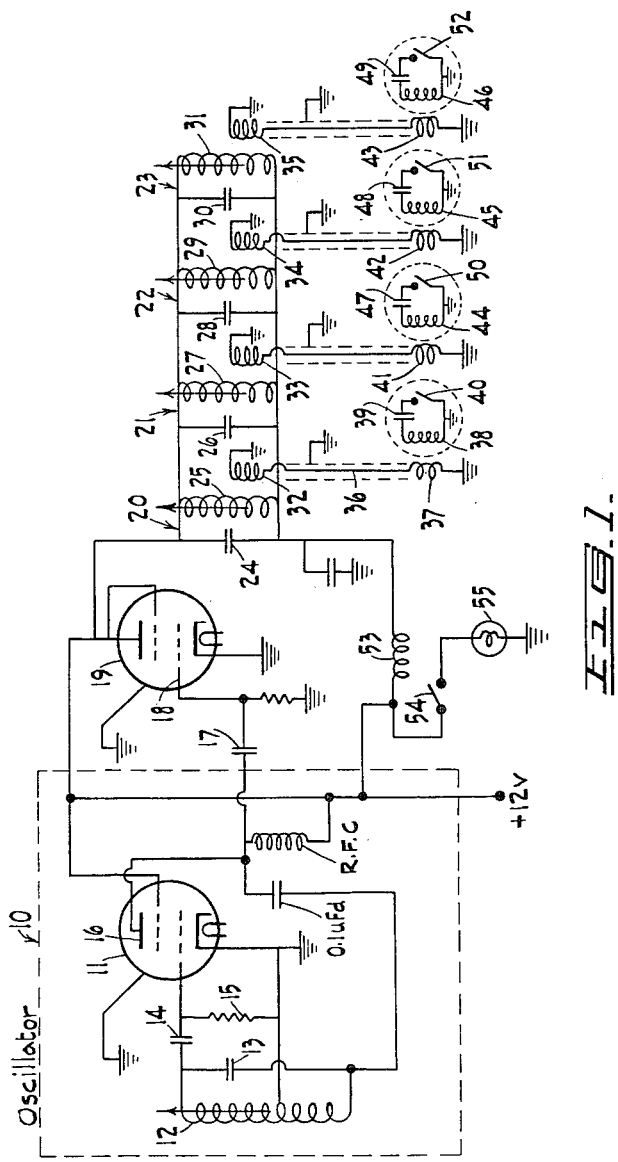

June 4, 1963

D. L. FIELD 3,092,806

APPARATUS FOR INDICATING AN ABNORMAL
CONDITION IN A VEHICLE WHEEL

Filed June 6, 1960

3 Sheets-Sheet 1

Inventor:
Dwight L. Field
By Kenyon, Palmer + Stewart

June 4, 1963
D. L. FIELD
3,092,806
APPARATUS FOR INDICATING AN ABNORMAL
CONDITION IN A VEHICLE WHEEL
Filed June 6, 1960
3 Sheets-Sheet 2
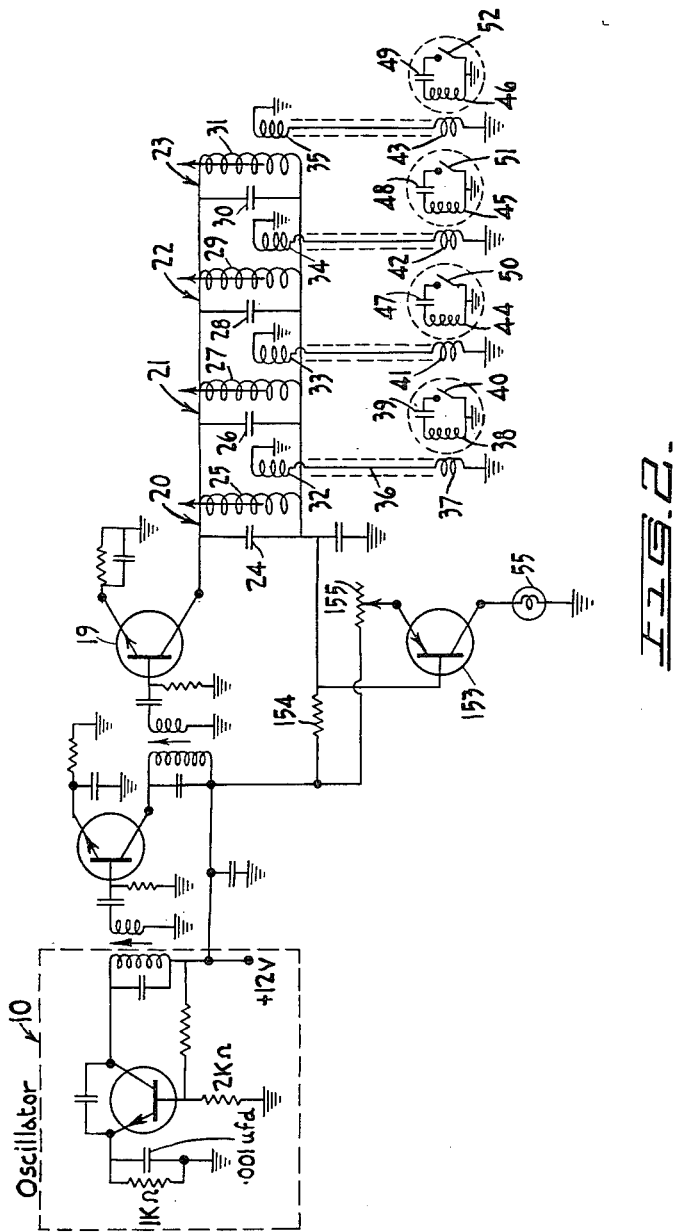
_FIG.2._
Inventor:
Dwight L. Field
By
Kenyon, Palmer & Stewart Inventor:
Dwight L. Field
By Kenox, Palmer & Stewart

United States Patent Office 3,092,806
Patented June 4, 1963

3,092,806
APPARATUS FOR INDICATING AN ABNORMAL CONDITION IN A VEHICLE WHEEL
Dwight L. Field, Forest, Ontario, Canada
Filed June 6, 1960, Ser. No. 34,298
6 Claims. (Cl. 340—58)

The present invention relates to apparatus for indicating an abnormal condition on the rotary portion of a vehicle wheel. Many devices have been developed for indicating that the inflation pressure of a pneumatic tire on a vehicle wheel is outside of the tolerances permitted for its proper operation and to give an alarm when such a condition arises. These devices may be grouped into two classes, the electrical devices and the mechanical devices. Insofar as the latter group is concerned, there are certain obvious difficulties in their operation. Where mechanical contact is made between the fixed portion of a wheel and the rotary portion considerable abrasion, especially when dirt is present, will result. Indeed the presence of dirt may be such that the mechanical device is frozen in a position and rendered inoperative. Such mechanical devices generally however have one advantage, and that is that they do not necessarily require rotation of the wheel in order to give an indication of the abnormal condition.

Known electrical devices of the character described have up to the present, relied upon rotation of the wheel to give a proper indication. Such devices have generally been of the type having a coil mounted on the wheel and rotating therewith, which coil is short-circuited when an abnormal pressure condition arises. The short-circuited coil passes in proximity to another coil mounted on the fixed portion of the wheel and in the short-circuited condition causes alteration in the current flowing through the coil mounted on the fixed portion of the wheel. Such a device is described and claimed in United States Patent No. 2,894,246, issued July 7, 1959, to De Graffenried. De Graffenried describes the operation of his device as having an intermittent transformer action which depends upon the rotation of the wheel. Further, De Graffenried has a switching mechanism to obtain an indication from each separate wheel.

The present invention overcomes the unreliability of the mechanical devices and at the same time provides an apparatus for indicating an abnormal tire pressure which does not require rotation of the wheel. In accordance with the present invention a device for indicating an abnormal condition on the rotary portion of a vehicle wheel comprises a parallel tuned resonant circuit having a capacitor, an annular coil and a switch adapted to complete the circuit in the event of an abnormal condition. The annular coil is mounted on the rotary portion of the vehicle wheel and coaxially with the axis of rotation thereof. A second annular coil is mounted on the fixed portion of the vehicle wheel coaxially with and magnetically coupled to the coil on the rotary portion. The second coil mounted on the fixed portion of the wheel is connected to means responsive to changes in the impedance of the second coil to give an indication of the abnormal condition at a remote location. Such means preferably comprise an amplifier circuit coupled to the second coil so that operation of the switch causes an increase in the plate current of the amplifier circuit. The increase in plate current is indicative of the abnormal condition.

In a preferred form of the invention a parallel tuned resonant circuit is included in the rotary portion of each wheel of a vehicle and each parallel tuned resonant circuit is coupled to the amplifier by a coil mounted on the fixed portion of each wheel. The abnormal condition in any wheel of the vehicle is operable to cause an increase in the plate current of the amplifier.

The above structure provides a simple reliable apparatus for indicating an abnormal condition on a vehicle wheel, not dependent upon the rotation of the wheel and not relying upon any direct mechanical connection between the rotary and fixed portions of the wheel. Any conventional form of pressure operated switch may be used to complete the parallel tuned resonant circuit, and this switch per se is not a part of the present invention.

Figure 3:
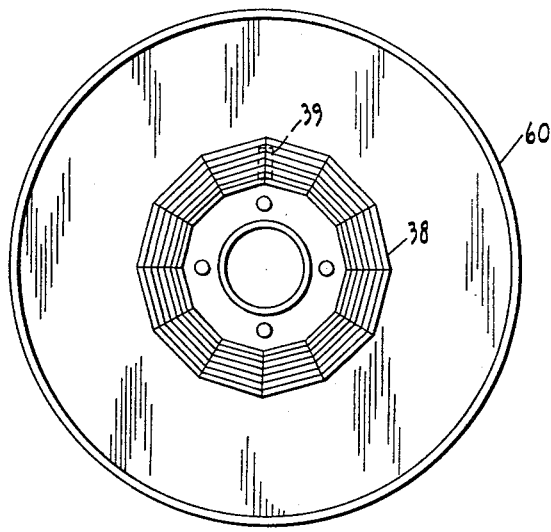
Figure 4:
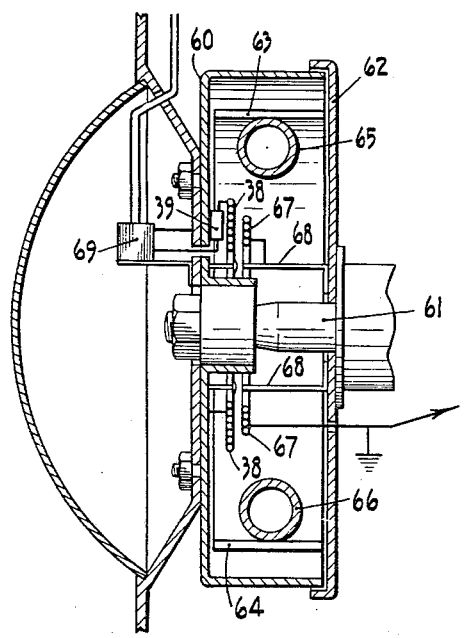

In drawings which illustrate the embodiments of the present invention:

FIGURE 1 is a schematic diagram of the electrical portions of an embodiment according to the present invention using vacuum tubes, FIGURE 2 is a schematic diagram of an apparatus similar to that shown in FIGURE 1 using transistors, FIGURE 3 is an elevation view of the interior of a wheel including a coil, and a condenser used with an apparatus constructed in accordance with the present invention, and, FIGURE 4 is a view partly in section of a wheel mounted on a vehicle showing the relative positions of the fixed and rotating coils.

Referring to FIGURE 1, the electrical apparatus shown in schematic form comprises a Hartley oscillator 10 consisting of a tetrode vacuum tube 11 and a resonant circuit consisting of a slug tuned coil 12 and fixed capacitor 13. The usual grid leak capacitor 14 and resistor 15 are connected between the grid and cathode. The output of the oscillator 10 is taken from the plate 16 and applied via capacitor 17 to the grid 18 of the vacuum tube 19. The oscillations generated by the oscillator 10 are then amplified in the vacuum tube 19 and are impressed across resonant circuits 20, 21, 22 and 23. The resonant circuit 21 consists of capacitor 24 and slug tuned coil 25. Similarly, resonant circuits 21, 22, and 23 consist of capacitors 26, 28 and 30 and slug tuned coils 27, 29 and 31 respectively. Coils 32, 33, 34 and 35 are coupled to slug tuned coils 25, 27, 29 and 31 respectively. By means of a conductor 36, the coil 32 is connected to a further coil 37 mounted on the non-rotating portion of a vehicle wheel in a manner to be described below. Coil 37 is coupled to coil 38 mounted on the rotating portion of a wheel in a manner to be described below. Coil 38 together with capacitor 39 forms a parallel tuned resonant circuit which is completed by the closing of switch 40. In a similar manner coils 33, 34 and 35 are connected to coils 41, 42 and 43 mounted on the fixed portions of other wheels of the vehicle and coupled to coils 44, 45 and 46 respectively mounted on the rotating portions of the remaining vehicle wheels. Capacitors 47, 48 and 49 are connected with coils 44, 45 and 46 respectively to form parallel resonant circuits which are completed by switches 50, 51 and 52.

The switches 40, 50, 51 and 52 are operated by an abnormal tire pressure or other condition existing on the rotating portion of the wheel. Should such a condition arise, the pressure operated switch associated with that wheel, for example switch member 40, is closed and the parallel resonant circuit consisting of coil 38 and capacitor 39 is completed, this parallel resonant circuit is coupled via coil 37, conductor 36 and coil 32 to the parallel resonant circuit 20 located in the plate circuit of the amplifier vacuum tube 19. The coupling of the parallel resonant circuit on the wheel to the parallel resonant circuit 20 causes an increase in plate current of the vacuum tube 19 which increases the current flowing through the relay coil 53 and causes the relay contacts 54 to close and light lamp 55 indicating an abnormal condition. Similarly, if any of the other resonant circuits mounted on the vehicle wheels are completed by operation of any of the switches 50, 51 or 52, then an increase in plate current of the amplifier 19 will also be induced causing the lamp 55 to be connected to the 12 volt source.

The embodiment just described shows a construction suitable for a four wheeled vehicle, although the invention is not limited to such vehicles. If additional wheels are to be monitored, then it is merely necessary to add further parallel resonant circuits in tandem with the circuits 20, 21, 22 and 23 and to couple these circuits with parallel resonant circuits mounted in the wheels, as previously described. An increase in static plate current will be experienced as further resonant circuits are added and this can be compensated for with appropriate adjustments to the relay 53.

The circuit as shown in FIGURE 1 is designed to operate from a 12-volt battery and obtains heater current and high voltage (B+) for the operation of the tubes directly from the 12-volt system. A type of vacuum tube adapted to this mode of operation is the type designated as the 12K5. Specific values of the components used in the circuit will depend on the operating frequency chosen and the selection of the values of the components is a matter of design which can be accomplished by anyone skilled in the art. A satisfactory operating frequency has been found to be 330 kilocycles per second.

FIGURE 2 illustrates a transistorised version of the circuit of FIGURE 1. In this circuit the vacuum tube oscillator has been replaced by a transistor oscillator and an extra amplification stage has been provided to account for the lower output of the transistor oscillator. Additionally, the relay 53 of FIGURE 1 has been replaced by the transistor 153. The values of the circuit elements marked on the drawing are typical values used in an operating embodiment of the invention.

As before, resonant circuits 20, 21, 22 and 23 are connected to the output of an amplifier 19, in this case the transistor amplifier. Each of these resonant circuits is made up of the same components as previously described in relation to FIGURE 1 and is coupled via identical coils to a parallel resonant circuit located in the rotating portion of a wheel. The operation of the transistorised circuit is substantially identical with the operation of the circuit described above using vacuum tubes with the exception of the transistor 153 and its associated components.

In the embodiment illustrated in FIGURE 2, the relay 53 and its contacts 54 of FIGURE 1 have been replaced by the transistor 153 which is shown as a p-n-p transistor and may advantageously be of the type 2N155A. The transistor 153 acts as a switch to connect the lamp 55 to the 12 volt source of power. The transistor 153 is caused to conduct when the transistor amplifier 19 draws an increased current through the resistor 154. The exact value of current required to cause the transistor 153 to conduct may be set by adjustment of the adjustable potentiometer 155. In practice, the potentiometer 155 would be adjusted until the lamp 55 extinguishes with each of the parallel resonant circuits in the wheels of the vehicle open and lights to full brilliancy when the amplifier 19 is loaded by the operation of one or more of the switches on the wheels.

FIGURES 3 and 4 show a typical vehicle wheel 60 on which a coil 38 and capacitor 39 are mounted. The coil 38 is a flat wound coil which is securely fastened to and spaced from the interior surface of the wheel 60, coaxially with the bearings of the wheel in any suitable manner. Actually due to space limitations on a passenger car the most space that can be allowed is approximately a quarter of an inch but on a truck three-quarters of an inch spacing is possible and this spacing provides an improvement in the operation of the device. One end of the capacitor 39 is connected to the coil 38 and the other end of the capacitor 39 is connected to a pressure responsive switch 69. The other end of the coil 38 is also connected to the pressure responsive switch 69. As mentioned above, the switch per se forms no part of the present invention and may be of a conventional form dictated by the use to which the switch is to be put. A feature of the present invention which should be noted is that the coil 38 is mounted adjacent the interior face of the wheel and concentrically with the axis of rotation of the wheel.

As shown in FIGURE 4, the wheel 60 is mounted to the axle 61 and the relation between the backing plate 62, the brake shoes 63 and 64 and the brake operating cylinders 65 and 66 is evident. As may be seen, the coil 38 is in facing relationship with a similar coil 67 mounted on a bracket 68 from the backing plate 62. The coil 67 similarly is mounted coaxially with the axis of rotation of the wheel 60. Thus as the wheel 60 rotates on the axle 61 the relative position of the coil 38 with respect to the coil 67 is maintained constant. Thus, there is no substantial alteration in the coefficient of coupling between the two coils due to rotation of the wheel and the two coils are uniformly coupled regardless of whether the wheel is stationary or in motion. The relative spacing of the two coils may be altered as necessary and the spacing between the two coils may be varied in order to meet the requirements of any particular operating frequency of the oscillator.

The present invention provides a simple and reliable apparatus for detecting abnormal conditions on a rotatable wheel. The electronic components of a sytsem constructed in accordance with the invention may all be mounted in the cab of the vehicle and the components on the wheel consist of coils, capacitors and a switch responsive to the abnormal condition. Such components are relatively rugged and will withstand the extremes of heat, dirt, water etc. liable to be encountered in use. Further, since the coefficient of coupling between the rotating and fixed coils on the wheels is substantially constant, an accurate indication is provided regardless of whether or not the vehicle is in motion. Since the fixed and rotating coils are both mounted within the wheel, substantially no radiation will be propagated outside the wheel and hence no radio interference will result from the use of the invention.

I claim:

1. Apparatus for indicating an abnormal condition on a rotatable vehicle wheel comprising a parallel resonant circuit having a capacitor and an annular coil mounted on said wheel coaxially therewith, a switch in said circuit adapted to operate in response to said abnormal condition to cause a change in the impedance of said circuit, a second annular coil mounted on the vehicle adjacent the rotatable wheel and coaxially with said first coil to establish a continuous, substantially uniform, coefficient of coupling between said first and second coils, and means responsive to changes in impedance in said second coil due to operation of said switch to give an indication of said abnormal condition at a remote location.

2. A device for indicating an abnormal condition on the rotary portion of a vehicle wheel comprising a parallel tuned resonant circuit including a capacitor and an annular coil and having a switch in series with said circuit adapted to complete said circuit in the event of an abnormal condition, said annular coil being mounted on the rotary portion of the vehicle wheel coaxially with the axis of rotation thereof, a second coil mounted on the fixed portion of said vehicle wheel coaxially with and continuously and substantially uniformly coupled to said first coil, said second coil being connected to an amplifier circuit to cause an increase in the output current of said amplifier circuit on operation of said switch, said increase in current being indicative of said abnormal condition.

3. Apparatus according to claim 2 wherein a parallel tuned resonant circuit is included in the rotary portion of each wheel of a vehicle and each parallel tuned resonant circuit is coupled to said amplifier by a coil mounted on the fixed portion of each wheel, an abnormal condition in each wheel of the vehicle being operable to cause an increase in the output current of said amplifier.

4. Apparatus according to claim 2 wherein said second coil is coupled to a second parallel resonant circuit in the output circuit of said amplifier, whereby on operation of said switch a change in the impedance of said second parallel resonant circuit occurs causing an increase in the output current of said amplifier circuit.

5. Apparatus according to claim 3 wherein each second coil is coupled to one of a plurality of second parallel tuned resonant circuits, said second parallel tuned resonant circuits being connected in tandem and in the output circuit of said amplifier, whereby on operation of one of said switches the impedance of the associated second parallel tuned resonant circuit is changed and causes an increase in the output current of said amplifier.

6. A system for indicating the presence of an abnormal condition on the rotary portion of a vehicle wheel comprising a resonant circuit mounted on said rotary portion of each wheel including a capacitor, an annular coil mounted coaxially with the axis of rotation of said rotary portion, and a switch adapted to be operated to complete said parallel resonant circuit in the presence of said abnormal condition, a second annular coil mounted upon the fixed portion of said wheel and coaxially with said first annular coil and continuously and substantially uniformly inductively coupled to said resonant circuit and to the output circuit of an amplifier whereby operation of said switch causes an increase in the output current of said amplifier and means adapted to respond to said increase in the output current of said amplifier to give a visual indication of the presence of an abnormal condition.

References Cited in the file of this patent

UNITED STATES PATENTS

| | | |
|---|---|---|
| 2,860,321 | Stickland et al. | Nov. 11, 1958 |
| 2,881,408 | Dudley | Apr. 7, 1959 |
| 2,894,220 | Ridgers et al. | July 7, 1959 |
| 2,894,246 | De Graffenried | July 7, 1959 |